United States Patent
Ku et al.

(10) Patent No.: US 8,495,882 B2
(45) Date of Patent: Jul. 30, 2013

(54) SYNGAS CLEANUP SECTION WITH CARBON CAPTURE AND HYDROGEN-SELECTIVE MEMBRANE

(75) Inventors: Anthony Yu-Chung Ku, Rexford, NY (US); Harish Radhakrishna Acharya, Clifton Park, NY (US); Parag Prakash Kulkarni, Niskayuna, NY (US); Scott Michael Miller, Clifton Park, NY (US); William Cook Livingood, III, Lakewood, CO (US)

(73) Assignee: General Electric Company, Niskayuna, NY (US)

( * ) Notice: Subject to any disclaimer, the term of this patent is extended or adjusted under 35 U.S.C. 154(b) by 924 days.

(21) Appl. No.: 12/538,327

(22) Filed: Aug. 10, 2009

(65) Prior Publication Data

US 2011/0030384 A1 Feb. 10, 2011

(51) Int. Cl.
*F02C 3/20* (2006.01)
*B01D 53/22* (2006.01)

(52) U.S. Cl.
USPC ............... 60/781; 6/780; 6/39.12; 6/39.464; 95/55; 96/10

(58) Field of Classification Search
USPC ........ 60/39.12, 39.464, 772, 780, 781; 95/55, 95/56; 96/8, 10, 11
See application file for complete search history.

(56) References Cited

U.S. PATENT DOCUMENTS

| | | |
|---|---|---|
| 4,654,047 A | 3/1987 | Hopkins et al. |
| 5,332,424 A | 7/1994 | Rao et al. |
| 6,161,397 A | 12/2000 | McNeil et al. |
| 6,216,441 B1 * | 4/2001 | Stats et al. ............... 60/39.182 |
| 6,568,208 B1 | 5/2003 | Fidkowski et al. |
| 7,163,648 B2 | 1/2007 | Asen et al. |
| 7,351,275 B2 | 4/2008 | Dunn |
| 7,396,382 B2 | 7/2008 | Ku et al. |
| 7,410,531 B2 | 8/2008 | Edlund et al. |
| 2003/0222015 A1 * | 12/2003 | Oyama et al. ............ 210/500.21 |
| 2007/0072949 A1 | 3/2007 | Ruud et al. |

(Continued)

FOREIGN PATENT DOCUMENTS

| | | |
|---|---|---|
| WO | 99/67587 A1 | 12/1999 |
| WO | 2007077138 A1 | 7/2007 |
| WO | 2007092084 A2 | 8/2007 |

OTHER PUBLICATIONS

PCT/US2010/042291 Search Report and Written Opinion Sep. 24, 2010.

(Continued)

*Primary Examiner* — Ted Kim
(74) *Attorney, Agent, or Firm* — Francis T. Coppa (57) ABSTRACT

A syngas cleanup section includes a water-gas shift reactor, a first operation unit and a second operation unit. The first operation unit includes a high permeance membrane with $H_2/CO_2$ selectivity in flow communication with the water-gas shift reactor to provide a $H_2$-rich permeate stream and an $H_2$-poor retentate stream. The second operation unit recovers $H_2$ and CO from the retentate stream to produce a single, $CO_2$-rich product stream, the entire content of which has a minimum pressure of at least about 10.0 bar. In one embodiment, the second operation unit includes a membrane with Knudsen selectivity for permeating $H_2$, CO and $CO_2$. In this embodiment, the permeate streams are combined to produce a $H_2$ and CO-rich fuel stream used by a combined cycle power generation unit to produce electricity, and the retentate stream is sent to a catalytic oxidation unit to produce the $CO_2$-rich product stream. In another embodiment, the second operation unit is the catalytic oxidation unit.

7 Claims, 4 Drawing Sheets

U.S. PATENT DOCUMENTS

| | | |
|---|---|---|
| 2008/0000350 A1 | 1/2008 | Mundschau et al. |
| 2008/0112867 A1* | 5/2008 | Wei et al. ............... 422/171 |
| 2008/0134895 A1 | 6/2008 | Ruud et al. |
| 2008/0141672 A1* | 6/2008 | Shah et al. ............... 60/648 |
| 2010/0077766 A1* | 4/2010 | Panuccio et al. ......... 60/780 |

OTHER PUBLICATIONS

K. Damen et al., "A Comparison of electricity and hydrogen production systems with CO2 capture and storage. Part A: Review and selection of promising conversion and capture technologies," Science Direct, Progress in Energy and Combustion Science, Elsevier, vol. 32, No. 2, ISSN:0360-1285, Jan. 1, 2006, pp. 215-246.

M. Amelio et al., "Integrated gasification gas combined cycle plant with membrane reactors: Technological and economical analysis," Science Direct, Energy Conversion & Management, Elsevier, vol. 48, Jun. 20, 2007, pp. 2680-2693.

* cited by examiner

SYNGAS CLEANUP SECTION WITH CARBON CAPTURE AND HYDROGEN-SELECTIVE MEMBRANE

CROSS-REFERENCE TO RELATED APPLICATIONS

This application is related to U.S. application Ser. No. 12/538,301, and U.S. application Ser. No. 12/538,268, both filed on the filing date of the present application. The contents of both of these applications is incorporated herein by reference.

BACKGROUND OF THE INVENTION

The application of syngas conversion and purification after a gasification process can be used for integrated gasification combined cycle (IGCC) power plants for electricity production from coal. It can also be used for gasification-based power plants that produce multiple products such as hydrogen and electricity from coal, and it is also useful for plants that include carbon dioxide separation. It is also applicable to purification of other hydrocarbon-derived syngas that can be used for electricity production or power, including syngas derived from natural gas, heavy oil, biomass and other sulfur-containing carbon fuels.

The commercialization of known "coal-to-hydrogen ($H_2$) and electricity" technologies (IGCC power plants or coal gasification-based power plants) has been hampered by the high capital costs associated with removing the most significant impurities, such as sulfur, present in coal. The stringent purity requirements for hydrogen fuel and the fuel specifications for the gas turbine are generally satisfied using a series of clean-up unit operations, which facilitate carbon monoxide (CO) conversion, sulfur removal, and final gas polishing. In addition, carbon dioxide ($CO_2$) removal is desirable in situations where $CO_2$ is captured for sequestration. The cleaned syngas produced can be sent to a combined cycle plant to produce electricity. Because syngas is a feedstock for manufacturing chemical and fuels, it can also be used in a power plant that integrates a combined cycle power plant and chemical reactors for power of electricity and chemical products. The chemical products can include hydrogen, ammonia, methanol, dimethyl ether and Fischer-Tropsch gasoline and diesel fuels. The $CO_2$ rich stream can be compressed and sent to sequestration.

Some known syngas clean-up technologies focus on removing each impurity in a separate unit operation. In a system configured to capture $CO_2$, raw fuel gas exiting the gasifier is cooled and cleaned of particulate before being routed to a series of sulfur removal units and water-gas-shift (WGS) reactors. Those unit operations convert CO and $H_2O$ present in the syngas to $CO_2$ and $H_2$, thereby concentrating it in the high-pressure raw fuel gas stream. Once concentrated, $CO_2$ and sulfur present in the stream can be removed using low temperature liquid-based absorption processes. The $CO_2$ is recovered from the absorption process in a manner that results in at least a fraction of the $CO_2$ being recovered at a lower pressure than the feed to the liquid absorber unit. $CO_2$ is then dried and compressed to supercritical conditions for pipeline transport. Part of the clean fuel gas from the liquid-based absorber unit, now rich in $H_2$ and also containing the unreacted CO from the WGS reactor, is either fired directly in a gas turbine, or used in other power systems. Waste heat is recovered from the process and used to raise steam to feed to a steam turbine. Part of the clean stream can be purified further to produce fuel grade $H_2$ product. However, because of the different operating requirements and parameters of each unit, known clean-up technologies may be expensive. Moreover, because of the large number of unit operations used, known clean-up technologies generally require large footprints within a plant. For example, at least some known units have auxiliary requirements for solvent regeneration and pollutant recovery. Known liquid absorption units for $CO_2$ and $H_2S$ involve low temperature processes that require the gas stream to be cooled resulting into energy loss and lower efficiency.

Membranes are selectively permeable barriers that can be used to separate gases and can be used in the syngas clean-up process to separate the syngas into a fuel-rich stream that can be used to generate electricity, and a $CO_2$-rich retentate stream to enable "carbon capture". The use of a membrane for carbon capture can involve the selective permeation of $CO_2$ through the membrane, separating it from the rest of the gas stream, or can involve the selective permeation of hydrogen, the primary fuel gas. In an ideal situation for some power generation systems, gas separation is carried out at high temperature and pressure, so as to minimize the necessity for compressing the $CO_2$ prior to sequestration.

A key challenge associated with hydrogen-selective membranes is the difficulty in recovering all of the fuel components of the shifted syngas stream. WGS reactors do not convert all of the CO in the raw syngas to $CO_2$. Membrane systems are typically suitable for rough stage cuts, and very large membrane areas are required for high recovery rates. Moreover, known hydrogen-selective membranes are not permeable to carbon monoxide and therefore are unable to transfer this gas to the fuel-rich permeate stream. Collectively, the residual $H_2$ and CO in the membrane retentate stream is referred to as the "slip." Therefore, IGCC plant designs using hydrogen-selective membranes to separate $CO_2$ require additional unit operations to ensure the overall thermal efficiency of the plant is not overly degraded by the $H_2$ and CO slip from the membrane separation system.

BRIEF SUMMARY OF THE INVENTION

In one aspect of the invention, an apparatus using a hydrogen-selective membrane for carbon capture comprises a water-gas shift reactor configured to receive a syngas from a gasification unit; a first unit operation in flow communication with the water-gas shift reactor, the first unit operation including a first, high permeance membrane with $H_2/CO_2$ selectivity in flow communication with the water-gas shift reactor, the first membrane providing a first, $H_2$-rich permeate stream and a first, $H_2$-poor, $CO_2$-rich and CO-rich retentate stream; and a second unit operation in flow communication with the first operation unit for receiving the first, $H_2$-poor, $CO_2$-rich and CO-rich retentate stream from the first unit operation, and recovering $H_2$ and CO from the first retentate stream to produce a $CO_2$-rich product stream, wherein an entire content of the $CO_2$-rich product stream produced by the second operation unit has a minimum pressure of at least about 10.0 bar.

In another aspect of the invention, an apparatus using a hydrogen-selective membrane for carbon capture comprises a water-gas shift reactor configured to receive a syngas from a gasification unit; a first unit operation in flow communication with the water-gas shift reactor, the first unit operation including a first, high permeance membrane with $H_2/CO_2$ selectivity in flow communication with the water-gas shift reactor, the first membrane providing a first, $H_2$-rich permeate stream and a first, $H_2$-poor, $CO_2$-rich and CO-rich retentate stream; a second unit operation in flow communication with the first operation unit for receiving the first, $H_2$-poor, $CO_2$- rich and CO-rich retentate stream from the first unit operation, the second unit operation including a second, high permeance membrane with Knudsen selectivity for permeating $H_2$, CO and $CO_2$ to produce a second permeate stream and a second retentate stream, the second membrane recovering $H_2$ and CO from the first retentate stream to produce a $CO_2$-rich product stream, wherein the first, $H_2$-rich permeate stream and the second permeate stream are combined to produce a $H_2$ and CO-rich fuel stream capable of being used by a combined cycle power generation unit to produce electricity, and wherein an entire content of the $CO_2$-rich product stream produced by the second operation unit has a minimum pressure of at least about 10.0 bar.

In yet another aspect of the invention, an apparatus using a hydrogen-selective membrane for carbon capture comprises a water-gas shift reactor configured to receive a syngas from a gasification unit; a first unit operation in flow communication with the water-gas shift reactor, the first unit operation including a first, high permeance membrane with $H_2/CO_2$ selectivity in flow communication with the water-gas shift reactor, the first membrane providing a first, $H_2$-rich permeate stream and a first, $H_2$-poor, $CO_2$-rich and CO-rich retentate stream; and a second unit operation in flow communication with the first operation unit for receiving the first, $H_2$-poor, $CO_2$-rich and CO-rich retentate stream from the first unit operation, the second unit operation including a catalytic oxidation unit for converting the CO in the first retentate stream into $CO_2$ to produce the $CO_2$-rich product stream, wherein the first, $H_2$-rich permeate stream is capable of being used by a combined cycle power generation unit to produce electricity, and wherein an entire content of the $CO_2$-rich product stream produced by the second operation unit has a minimum pressure of at least about 10.0 bar.

In still yet another aspect of the invention, a method for producing hydrogen gas, comprises:

forming a syngas in a gasification unit;

receiving the syngas from the gasification unit in a water-gas shift reactor;

receiving the syngas from the water-gas shift reactor in a first unit operation that includes a first, high permeance membrane with $H_2/CO_2$ selectivity in flow communication with the water-gas shift reactor, the first membrane providing a first, $H_2$-rich permeate stream and a first, $H_2$-poor, $CO_2$-rich and CO-rich retentate stream; and receiving the first, $H_2$-poor, $CO_2$-rich and CO-rich retentate stream from the first unit operation in a second unit operation, the second unit operation recovering $H_2$ and CO from the first retentate stream to produce a $CO_2$-rich product stream, whereby an entire content of the $CO_2$-rich product stream produced by the second operation unit has a minimum pressure of at least about 10.0 bar.

DETAILED DESCRIPTION OF THE INVENTION

Figure 1:
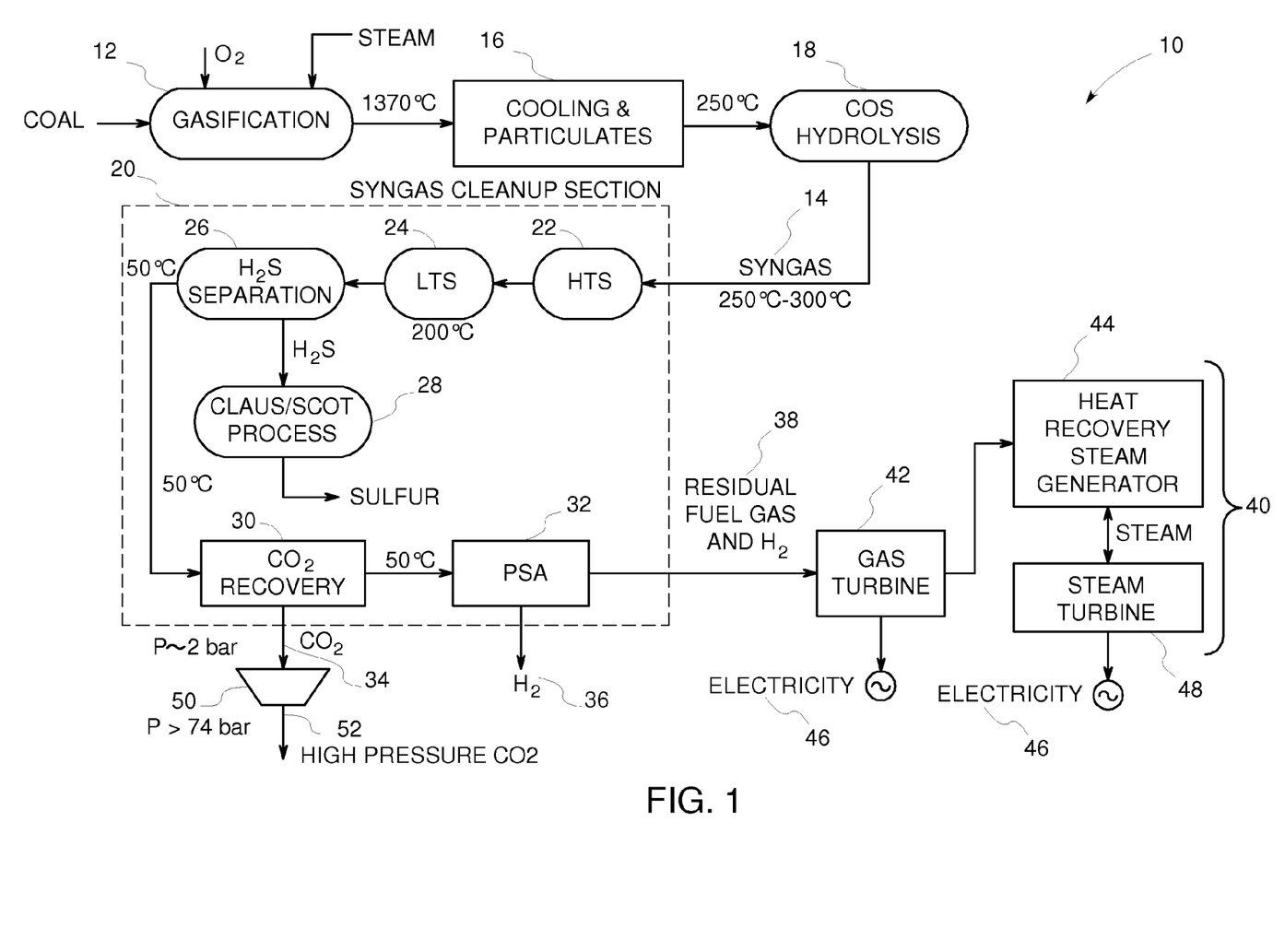
FIG. 1 is a schematic view of an exemplary polygeneration plant including a known syngas clean-up section and configured for $CO_2$ capture.

FIG. 1 is a schematic view of an exemplary polygeneration plant 10 for hydrogen gas ($H_2$) and electricity production with carbon dioxide ($CO_2$) separation. The plant 10 includes a gasification unit 12 that converts a carbon-containing feedstock, oxygen containing material, and high temperature steam or water into a synthesis gas (syngas) stream 14. The carbon-containing feedstock can be in the form of coal, petcoke, biomass, and the like. The gasification unit 12 is in flow communication with a series of syngas coolers 16 configured to remove heat and particulates and with a carbonyl sulfide (COS) hydrolysis unit 18 that is configured to convert COS to hydrogen sulfide ($H_2S$) in the syngas 14. The syngas 14 is then processed through a syngas clean-up section 20 according to the invention.

In the exemplary embodiment, the clean-up section 20 includes a plurality of individual unit operations including a high-temperature shift (HTS) reactor 22, a low-temperature shift (LTS) reactor 24, a $H_2S$ separation unit 26, a solvent regeneration (Claus/Scot processes) unit 28, a $CO_2$ recovery unit 30, and a pressure swing adsorption (PSA) unit 32. The HTS 22 includes a catalyst optimized for high temperature (about 300-400° C.) operation and the LTS 24 includes a catalyst optimized for low temperature (about 200° C.) operation.

During operation, a thermodynamically limited water-gas-shift reaction ($CO+H_2O \leftrightarrow CO_2+H_2$) converts carbon monoxide (CO) to $CO_2$, but does not proceed to completion in the presence of $CO_2$, thus leaving approximately 2-3% CO in the syngas 14. The syngas 14 is then cooled to approximately 50° C. such that, the majority of steam present in the syngas 14 is condensed, along with any water-soluble acid gases such as, but not limited to, hydrogen chloride (HCl) and/or ammonia ($NH_3$). The $H_2S$ is then typically removed using either a physical or a chemical absorption process in the $H_2S$ separation unit 26. Both the $H_2S$ removal processes require the use of solvents, such as Selexol, which are regenerated in solvent regeneration unit 28, and elemental sulfur (S) is produced. The gas exiting the $H_2S$ separation unit 26 enters the $CO_2$ recovery unit 30, where a $CO_2$ product stream 34 comprising substreams at different pressures, is removed by using a solvent similar to one used in the $H_2S$ separation unit 26. The $CO_2$ product substreams 34 exiting the $CO_2$ recovery unit 30 have pressures of about 1.5, 11.0, 17.0, and 20.0 bar, where a compressor train 50 increases the pressure of the $CO_2$ product stream 52 to at least about 74.0 bars. In a representative example using a physical sorbent, the substreams comprise about 34%, 16%, 36% and 13% of the $CO_2$ entering the $CO_2$ recovery unit 30, respectively. Thus, the compressor train 50 is required to increase the pressure of the $CO_2$ product stream 34 exiting the $CO_2$ recovery unit 30 by up to a factor of about forty (40). After $CO_2$ recovery, the syngas 14 enters the PSA 32, which facilitates removing any remaining impurities, providing approximately 99.99% pure $H_2$ 36. The PSA 32 also provides residual fuel gas and the $H_2$ 38, which are in turn used by a combined cycle power generation unit 40, which includes a gas turbine 42, a heat recovery steam generator 44 and steam turbine 48 to produce electricity 46.

Figure 2:
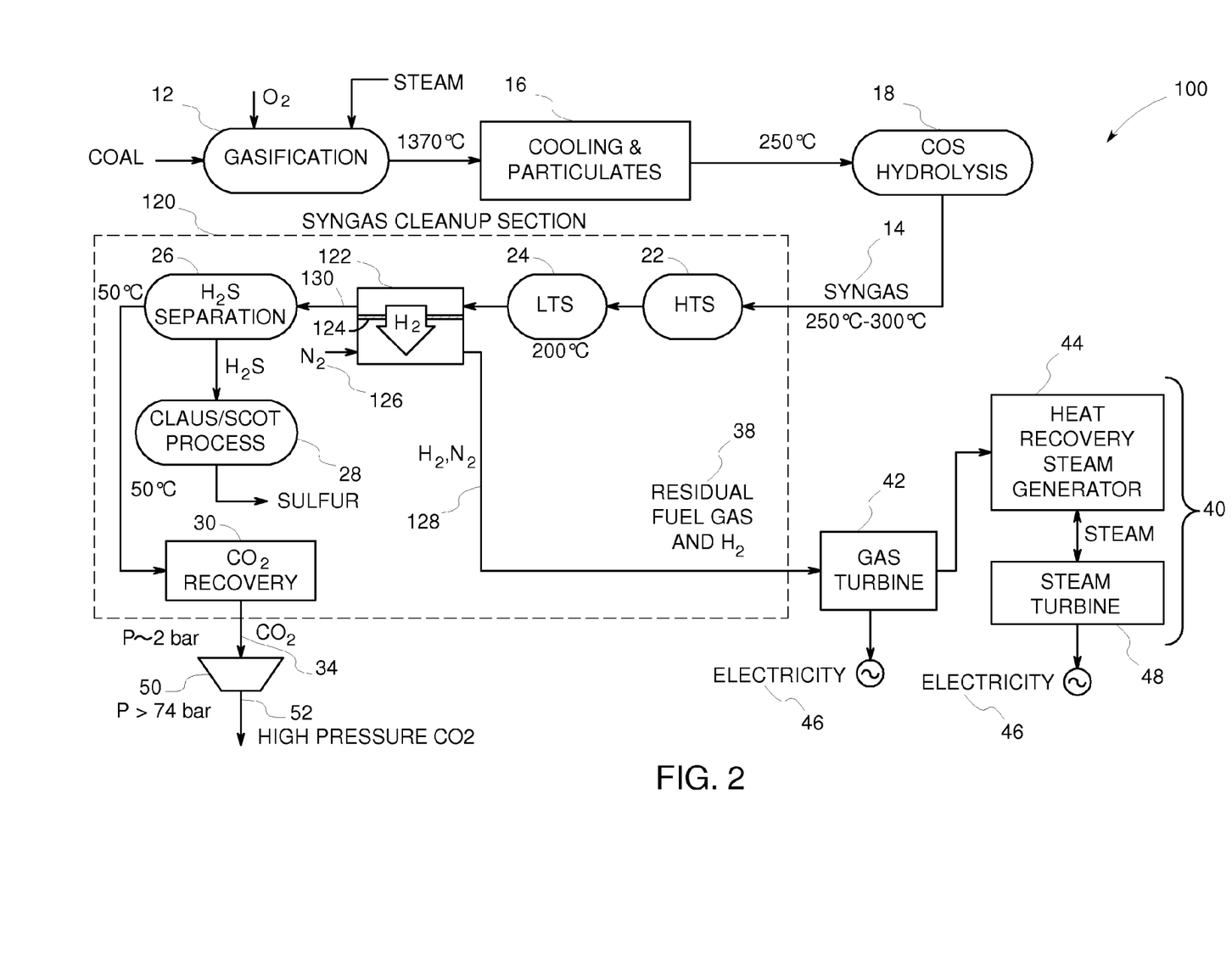
FIG. 2 is a schematic view of an exemplary embodiment of an IGCC power plant including an integrated syngas clean-up section and configured for $CO_2$ capture, according to an embodiment of the invention.

FIG. 2 is another exemplary embodiment of an IGCC power plant 100 for electricity production with $CO_2$ separation. The IGCC plant 100 is similar to IGCC plant 10, (shown in FIG. 1) and components of IGCC plant 100 that are identical to IGCC plant 10 are identified in FIG. 2 using the same reference numbers used in FIG. 1.

In the exemplary embodiment, IGCC plant 100 is configured to process syngas 14 through an exemplary embodiment of a syngas clean-up section 120. The syngas clean-up section 120 includes a membrane module 122 positioned between the LTS 22 and the $H_2S$ separation unit 26 of FIG. 1. In the exemplary embodiment, the membrane module 122 includes a high $H_2/CO_2$ selectivity, high permeance membrane 124 that is $H_2$ selective, and thus continuously removes the $H_2$ produced in the HTS reactor 22 and the LTS reactor 24.

During operation, $H_2$ passes through the membrane 124. A high-pressure sweep gas 126, such as $N_2$, and the like, is introduced to membrane module 122 to remove $H_2$ through a stream 128, which is depleted in $CO_2$ and $H_2S$. The $CO_2$ that is produced by the HTS reactor 22 and the LTS reactor 24 that exits the membrane module 122 is a $H_2$-poor, $CO_2$-rich and CO-rich retentate stream 130 that can be processed by the $H_2S$ separation unit 26. The gas stream 132 exiting the $H_2S$ separation unit 26 enters the $CO_2$ recovery unit 30, where a $CO_2$ product stream 34, comprising substreams of $CO_2$ at different pressures, is removed by using a solvent similar to one used in the $H_2S$ separation unit 26. Similar to the embodiment of FIG. 1, the $CO_2$ product stream 34 exiting the $CO_2$ recovery unit 30 comprises substreams with pressures of about 1.5, 11.0, 17.0, and 20.0 bar, where a compressor train 50 increases the pressure of the $CO_2$ product stream 52 to at least about 74.0 bar. Thus, the compressor 50 is required to increase the pressure of the $CO_2$ product stream 34 exiting the $CO_2$ recovery unit 30 by up to a factor of about forty (40).

The two-stage water-gas-shift designs of FIG. 1 using the HTS 22 followed by the LTS 24 is currently used to achieve high $CO_2$ capture rates, but the residual CO comprises about 2-3% of the shifted syngas stream. A third shift reactor can be added to complete the removal process, but would incur substantial additional cost. In addition, the stream 130 from the membrane module 122 of FIG. 2 contains approximately 64% $CO_2$, 23% $H_2O$, 5% CO, and 1-5% $H_2$. A conventional liquid solvent process, such as the Selexol process, can be used to remove the $CO_2$ from the stream 130, and then recycle the CO and $H_2$ stream to the gas turbine 42. However, this approach incurs a substantial cost, reducing the incentive for using the $H_2$ membrane module 122 for carbon capture.

Figure 3:
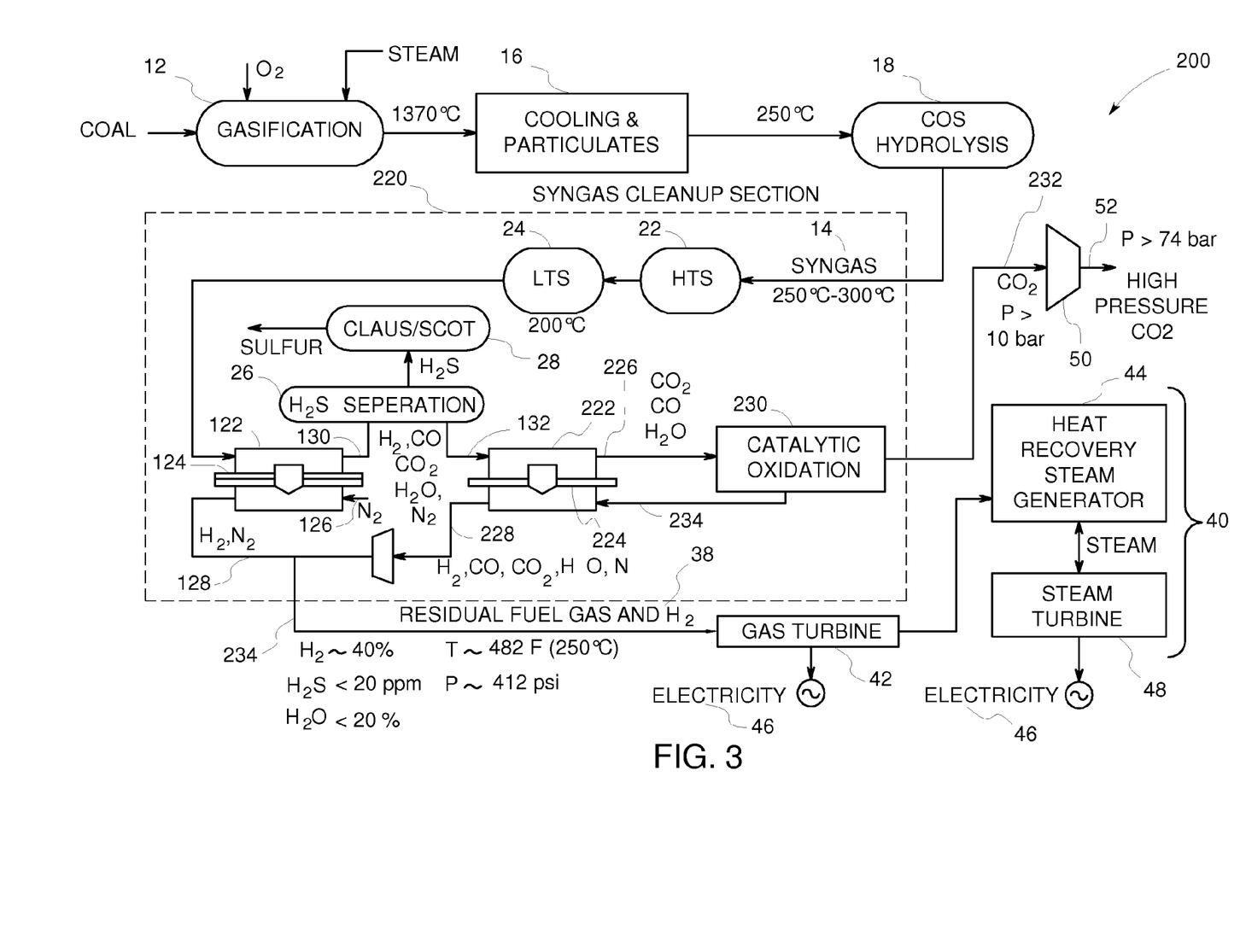
FIG. 3 is a schematic view of another exemplary embodiment of an IGCC power plant including an integrated syngas clean-up section and configured for CO2 capture, according to an alternate embodiment of the invention.

FIG. 3 is another exemplary embodiment of an IGCC power plant 200 for electricity production with $CO_2$ separation. The IGCC plant 200 is similar to IGCC plants 10, 100 (shown in FIGS. 1 and 2) and components of IGCC plant 200 that are identical to IGCC plants 10, 100 are identified in FIG. 3 using the same reference numbers used in FIGS. 1 and 2.

In the exemplary embodiment, IGCC plant 200 is configured to process syngas 14 through an exemplary embodiment of a syngas clean-up section 220. The syngas clean-up section 220 includes and a first operation unit 122 and a second operation unit 222 arranged in series with the first operation unit 122. However, the first operation unit 122 and the second operation unit 222 can be in a parallel arrangement to facilitate maintenance and fuel flexibility.

In this embodiment, the first operation unit 122 includes a high $H_2/CO_2$ selectivity, high permeance membrane 124 used to achieve a stage cut corresponding to $H_2$ recovery between approximately 50% and 99%. The $H_2$ recovery can be selectively adjusted in the membrane 124 to achieve a $CO_2$ capture rate between about 25% and about 90%. The membrane 124 comprises a porous support coated with a $H_2$ selective layer. Desirably, the membrane material is stable at the operating conditions of the apparatus.

For example, the membrane 124 can be made of a ceramic material. Examples of suitable porous support materials include, but are not limited to, aluminum carbide, aluminum nitride, aluminum oxide, beryllium oxide, boron carbide, boron nitride, cubic boron nitride, hafnium carbide, silicon boride, silicon carbide, silicon nitride, titanium boride, titanium carbide, titanium nitride, and zirconium carbide. The porous support provides mechanical support to the microporous ceramic layer and facilitates mass transport from a first surface of the membrane structure to a second surface of the membrane structure. Typically, the porous support has a porosity volume fraction greater than about 5%. In one embodiment, the porous support has a porosity volume fraction in a range from about 20% to about 70%. In one embodiment, the porous support has a median pore size in the range from about 0.1 micrometers to about 10.0 micrometers.

The microporous ceramic includes a plurality of pores disposed within a matrix material. Examples of matrix materials include aluminum oxide, boron nitride, boron carbo-oxynitrides, silicon oxide, titanium oxide, zirconium oxide, and synthetic zeolites. The membrane 124 may comprise various combinations of these ceramic materials, as well as versions of these ceramic materials doped with metal elements. In an exemplary embodiment, the high $H_2/CO_2$ selectivity, high permeance membrane 124 comprises an aluminum oxide support coated with a microporous oxide. The dimension of the pores and the density of the pores control the permeance of gas species though the porous membrane structure. $H_2$ has a much greater rate of transport through microporous ceramic materials than $CO_2$ or CO.

In another example, the high $H_2/CO_2$ selectivity, high permeance membrane 124 comprises a dense metal film coated onto an inorganic support. Examples of suitable metals include, but are not limited to, cobalt, copper, nickel, niobium, palladium, silver, vanadium, zirconium, or alloys of these elements. In an exemplary embodiment, the membrane 124 comprises a copper-palladium alloy. Metal membranes have a high selectivity for $H_2$ over $CO_2$ and CO.

The retentate stream 130 from the first operation unit 122 is cooled and sent to the $H_2S$ separation unit 26. The gas stream 132 exiting the $H_2S$ separation unit 26 enters a second operation unit 222 comprising a high permeance membrane 224 with Knudsen selectivity. The high permeance membrane 224 of the second operation unit 222 permeates $H_2$ and CO, along with some amount of $CO_2$. The high permeance membrane 224 can be made of a mesoporous material having a pore size between about 2.0 nm and about 30.0 nm. In an embodiment, the high permeance membrane 224 has a lower selectivity for $H_2$ than the membrane 124. Knudsen selectivity refers to the selectivity obtained when gases diffuse through a porous membrane, wherein the dominant mechanism for transport is Knudsen diffusion. The ideal Knudsen selectivity of a membrane for a given pair of gases is equal to the inverse square root of the molecular masses of the two gases. For example, the Knudsen selectivity of $H_2/CO_2$ is about 4.7 (i.e., square root of 44/2=22), the Knudsen selectivity of $H_2/CO$ is about 3.7 (i.e., square root of 28/2=14) and the Knudsen selectivity of $CO/CO_2$ is 1.25 (i.e., square root of 44/28=1.6). This is in contrast to a high selectivity membrane 124, where the $H_2$ transport is much faster than both the CO and $CO_2$.

The permeate streams 128, 228 from the first and second operation units 122, 222 are combined to produce a $H_2$ and CO-rich fuel stream 236 and sufficiently low $CO_2$ to achieve the desired rate of $CO_2$ capture at sufficient pressure to be combusted in a turbine to produce electricity. To facilitate operability of the module system in a plant, several unit operations can be inserted between the first and second module to remove components, such as $H_2O$ and $H_2S$.

The $H_2$-poor retentate stream 226 from the second operation unit 222 can be purified by a third operation unit 230, such as a catalytic oxidation unit, and the like, to produce a single, high-pressure, $CO_2$-rich product stream 232 having a minimum pressure of at least about 10.0 bar, i.e., substantially the entire content of the $CO_2$-rich product stream 232 produced by the second operation unit 222 has a minimum pressure of at least about 10.0 bar. In a preferred embodiment, the entire content of the $CO_2$-rich product stream 232 produced by the second operation unit 222 has a minimum pressure of at least about 15.0 bar. By contrast, the $CO_2$ product stream 34 produced by the embodiments of FIGS. 1 and 2 comprise substreams that have pressures ranging from about 1.5 bar to about 20.0 bar.

The catalytic oxidation unit 230 converts the $H_2$ in the retentate stream 130 into $H_2O$, and the CO in the retentate stream 226 into $CO_2$ to produce a $CO_2$-rich product stream 232, and the heat generated by the reaction generates a high pressure stream 234 of steam that is introduced to the second operation unit 222 to remove $H_2$ through a stream 128. The high-pressure, $CO_2$-rich product stream 232 from the catalytic oxidation unit 230 is fed to the compressor train 50 that increases the pressure of the $CO_2$ product stream 52 to at least about 74.0 bars. Thus, in this embodiment, the compressor train 50 is only required to increase the pressure of the $CO_2$ product stream 232 exiting the catalytic oxidation unit 230 by a factor of about five (5), as compared to up a factor of about forty (40) for one of the substreams required in the embodiments shown in FIGS. 1 and 2. This reduction in pressurization requirements represents a significant cost savings in the overall performance of the power plant 200. Catalytic oxidation systems are commercially available for the oxidation of CO and $H_2$ in gas streams. For this application, the catalytic oxidation system comprises a high pressure containment vessel and a heat exchanger to produce steam from the heat generated during oxidation. It should be appreciated that a pure oxygen stream (not shown) needs to be provided to the catalytic oxidation system in FIG. 3.

Figure 4:
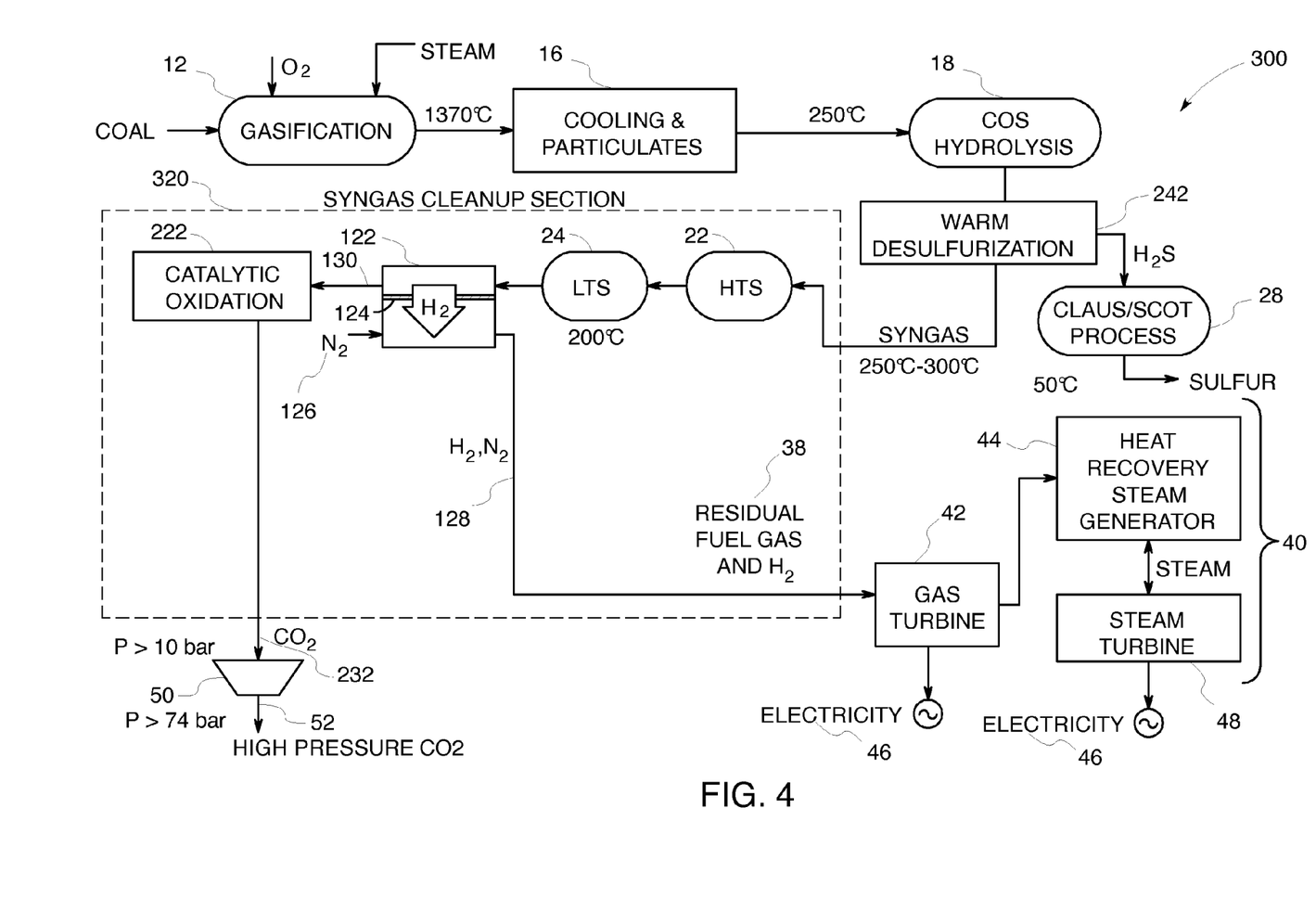
FIG. 4 is a schematic view of another exemplary embodiment of an IGCC power plant including an integrated syngas clean-up section and configured for $CO_2$ capture, according to another alternate embodiment of the invention.

FIG. 4 is another exemplary embodiment of an IGCC power plant 300 for electricity production with $CO_2$ separation. The IGCC plant 300 is similar to IGCC plants 10, 100, 200 (shown in FIGS. 1-3) and components of IGCC plant 300 that are identical to IGCC plants 10, 100, 200 are identified in FIG. 4 using the same reference numbers used in FIGS. 1-3.

In the exemplary embodiment, IGCC plant 300 is configured to process syngas 14 through an exemplary embodiment of a syngas clean-up section 320. The syngas clean-up section 220 includes a first operation unit 122 and a second operation unit 222 arranged in series with the first operation unit 122. However, the first operation unit 122 and the second operation unit 222 can be in a parallel arrangement to facilitate maintenance and fuel flexibility.

The embodiment shown in FIG. 4 is substantially identical to the embodiment shown in FIG. 3, except the second operation unit 222 is the catalytic oxidation unit 230, rather than the high permeance membrane 224 with Knudsen selectivity. In addition, the power plant 300 includes a warm desulfurization unit 242 that removes $H_2S$ prior to being sent to the syngas cleanup section 320. The warm desulfurization unit can use a regenerable solid sorbent, such as zinc oxide which reacts with $H_2S$ to remove it from the syngas stream. One example of a commercial system that has been developed for this purpose is the RTI/Eastman warm gas cleanup process. (http://www.gasification.org/Docs/Conferences/2008/36GUPTA.pdf.)

Similar to the embodiment shown in FIG. 3, the catalytic oxidation unit 230 converts the CO in the first retentate stream into $CO_2$ to produce the single, high-pressure, $CO_2$-rich product stream 232 having a minimum pressure of at least about 10.0 bar, i.e., the entire content of the $CO_2$-rich product stream 232 produced by the catalytic oxidation unit 230 has a minimum pressure of at least about 10.0 bar. In a preferred embodiment, the entire content of the $CO_2$-rich product stream 232 produced by the catalytic oxidation unit 230 has a minimum pressure of at least about 15.0 bar. By contrast, the $CO_2$ product stream 34 produced by the embodiments of FIGS. 1 and 2 comprise substreams that have pressures ranging from about 1.5 bar to about 20.0 bar. The high-pressure, $CO_2$-rich product stream 232 from the catalytic oxidation unit 230 is fed to the compressor 50 that increases the pressure of the $CO_2$ product stream 52 to at least about 74.0 bar. Thus, in this embodiment, the compressor 50 is only required to increase the pressure of the $CO_2$ product stream 232 exiting the catalytic oxidation unit 230 by a factor of about seven and one-half (7.5), as compared to a factor of about thirty-seven (37) required in the embodiments shown in FIGS. 1 and 2. This reduction in pressurization requirements represents a significant cost savings in the overall performance of the power plant 300. It should be appreciated that a pure oxygen stream (not shown) needs to be provided to the catalytic oxidation system in FIG. 4.

The above-described IGCC plants based on high-temperature membrane separation of carbon dioxide from syngas offers many advantages for an integrated coal-to-$H_2$ and electricity power process. The integrated concept allows for a reduced energy cost for $CO_2$ capture, lower capital cost, and a smaller overall footprint for the plant. Furthermore, the integrated approach leverages synergies between water-gas shift reactions and the need for $CO_2$ removal. The use of membranes for $H_2S$ removal eliminates the need for energy-intensive solvent regeneration and sulfur recovery units. The economic benefits of the module will facilitate commercialization of IGCC electricity generation plants or IGCC power with $CO_2$ separation plants. The elimination of four unit operations ($H_2S$ removal, $CO_2$ removal, solvent regeneration and PSA) and the consolidation of two others (HTS, LTS) into an integrated module will significantly reduce capital costs which will have a significant impact on the economic feasibility of coal-based $H_2$ production technologies.

An exemplary embodiment of an integrated, high temperature syngas clean-up section is described in detail above. The syngas clean-up section is not limited to the specific embodiments described herein, but rather, components of the clean-up section may be utilized independently and separately from other components described herein. Furthermore, the need to remove $CO_2$ is not unique to coal-derived plants, and as such, the integrated syngas clean-up section could be used for alternative fuel or biomass systems to convert low-value syngas to high-purity $H_2$. Therefore, the invention can be implemented and utilized in connection with many other fuel systems and turbine configurations.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this

The invention claimed is:

1. An apparatus using a hydrogen-selective membrane for carbon capture, comprising:
   a water-gas shift reactor configured to receive a syngas from a gasification unit;
   a first unit operation in flow communication with the water-gas shift reactor, the first unit operation including a first, high permeance membrane with $H_2/CO_2$ selectivity in flow communication with the water-gas shift reactor, the first membrane providing a first, $H_2$-rich permeate stream and a first, $H_2$-poor, $CO_2$-rich and CO-rich retentate stream; and
   a second unit operation in flow communication with the first operation unit for receiving the first, $H_2$-poor, $CO_2$-rich and CO-rich retentate stream from the first unit operation, the second unit operation recovering $H_2$ and CO from the first retentate stream to produce a $CO_2$-rich product stream,
   wherein an entire content of the $CO_2$-rich product stream produced by the second operation unit has a minimum pressure of at least about 10.0 bar, and
   wherein the second unit operation comprises a second, high permeance membrane with Knudsen selectivity for permeating $H_2$, CO and $CO_2$ to provide a second permeate stream and a second retentate stream, and
   wherein the first, $H_2$-rich permeate stream and the second permeate stream are combined to produce a $H_2$ and CO-rich fuel stream capable of being used by a combined cycle power generation unit to produce electricity.

2. An apparatus according to claim 1, further comprising a third unit operation including a catalytic oxidation unit for converting the CO in the second retentate stream into $CO_2$ to produce the $CO_2$-rich product stream.

3. An apparatus according to claim 1, further comprising a $H_2S$ separation unit in flow communication with the first operation unit for removal of $H_2S$ from the first retentate stream prior to being sent to the second operation unit.

4. An apparatus using a hydrogen-selective membrane for carbon capture, comprising:
   a water-gas shift reactor configured to receive a syngas from a gasification unit;
   a first unit operation in flow communication with the water-gas shift reactor, the first unit operation including a first, high permeance membrane with $H_2/CO_2$ selectivity to produce a first, $H_2$-rich permeate stream and a first, $H_2$-poor, $CO_2$-rich and CO-rich retentate stream;
   a second unit operation in flow communication with the first operation unit for receiving the first, $H_2$-poor, $CO_2$-rich and CO-rich retentate stream from the first unit operation, the second unit operation including a second, high permeance membrane with Knudsen selectivity for permeating $H_2$, CO and $CO_2$ to produce a second permeate stream and a second retentate stream, the second membrane recovering $H_2$ and CO from the first retentate stream to produce a $CO_2$-rich product stream; and
   a third unit operation comprising a catalytic oxidation unit for converting the CO in the second retentate stream into $CO_2$ to produce the $CO_2$-rich product stream,
   wherein the first, $H_2$-rich permeate stream and the second permeate stream are combined to produce a $H_2$ and CO-rich fuel stream capable of being used by a combined cycle power generation unit to produce electricity, and
   wherein an entire content of the $CO_2$-rich product stream produced by the second operation unit has a minimum pressure of at least about 10.0 bar.

5. An apparatus according to claim 4, further comprising a $H_2S$ separation unit in flow communication with the first operation unit for removal of $H_2S$ from the first retentate stream prior to being sent to the second operation unit.

6. A method for producing hydrogen gas, comprising:
   forming a syngas in a gasification unit;
   receiving the syngas from the gasification unit in a water-gas shift reactor;
   receiving the syngas from the water-gas shift reactor in a first unit operation that includes a first, high permeance membrane with $H_2/CO_2$ selectivity in flow communication with the water-gas shift reactor, the first membrane providing a first, $H_2$-rich permeate stream and a first, $H_2$-poor, $CO_2$-rich and CO-rich retentate stream;
   receiving the first, $H_2$-poor, $CO_2$-rich and CO-rich retentate stream from the first unit operation in a second unit operation, the second unit operation recovering $H_2$ and CO from the first retentate stream to produce a $CO_2$-rich product stream; and
   combining the first, $H_2$-rich permeate stream and the second permeate stream to produce a $H_2$ and CO-rich fuel stream; and
   combusting the $H_2$ and CO-rich fuel stream in a combined cycle power generation plant to produce electricity,
   whereby an entire content of the $CO_2$-rich product stream produced by the second operation unit has a minimum pressure of at least about 10.0 bar, and
   whereby the second unit operation includes a second, high permeance membrane with Knudsen selectivity for permeating $H_2$, CO and $CO_2$ to produce a second permeate stream and a second retentate stream.

7. A method according to claim 6, further comprising removing $H_2S$ from the first retentate stream prior to being received by the second operation unit.

* * * * *